Feb. 23, 1932.　　　E. M. BALLAMOS　　　1,846,782
COINCIDENTAL LOCK
Filed April 30, 1926　　2 Sheets-Sheet 1

INVENTOR.
ELIZABETH M. BALLAMOS
BY
ATTORNEY.

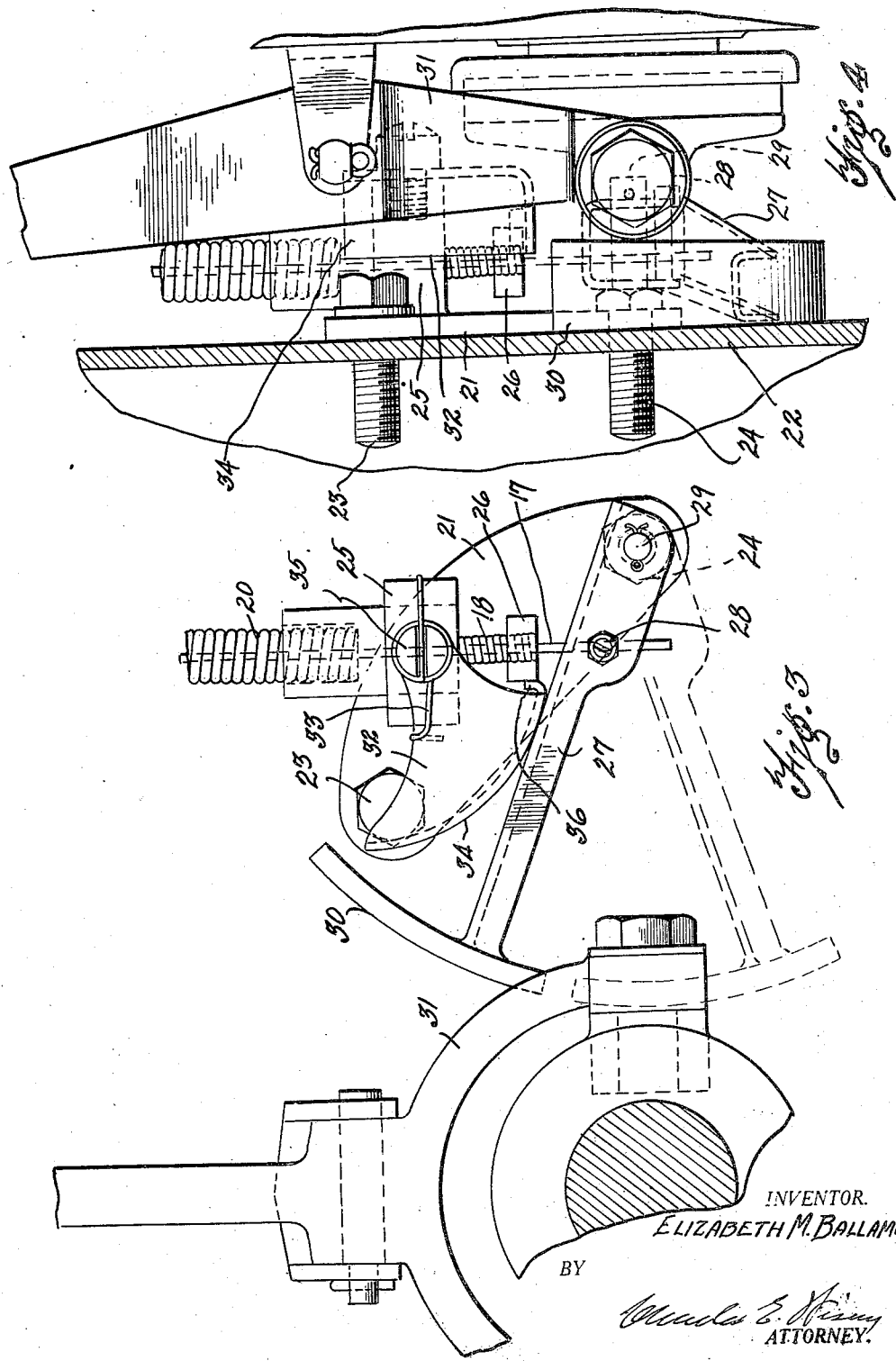

Patented Feb. 23, 1932

1,846,782

UNITED STATES PATENT OFFICE

ELIZABETH M. BALLAMOS, OF PONTIAC, MICHIGAN

COINCIDENTAL LOCK

Application filed April 30, 1926. Serial No. 105,673.

This invention relates to automobile locks and the object of the invention is to provide a lock for locking the ignition circuit of an automobile and providing a co-incidental lock for the automobile clutch.

Another object of the invention is to provide a coincidental clutch lock which will become permanently locked if tampered with.

A further object of the invention is to provide an ignition lock which upon being locked automatically locks the coincidental clutch lock.

A further object of the invention is to provide an automobile lock in which the breaking of the ignition circuit upon being locked also automatically grounds the ignition system so that no current will flow therethrough.

Another object of the invention is to provide an automobile lock in which the clutch is held from engaging while the lock remains in the locked position and upon release of the lock the clutch may be engaged or disengaged without interference.

These objects and the several novel features of the invention are hereinafter more fully described and claimed and the preferred form of construction by which these objects are attained is shown in the accompanying drawings in which—

Fig. 3 is a view showing the coincidental clutch lock in the unlocked position.

Fig. 4 is a plan view showing the coincidental lock in the locked position.

Figure 1:
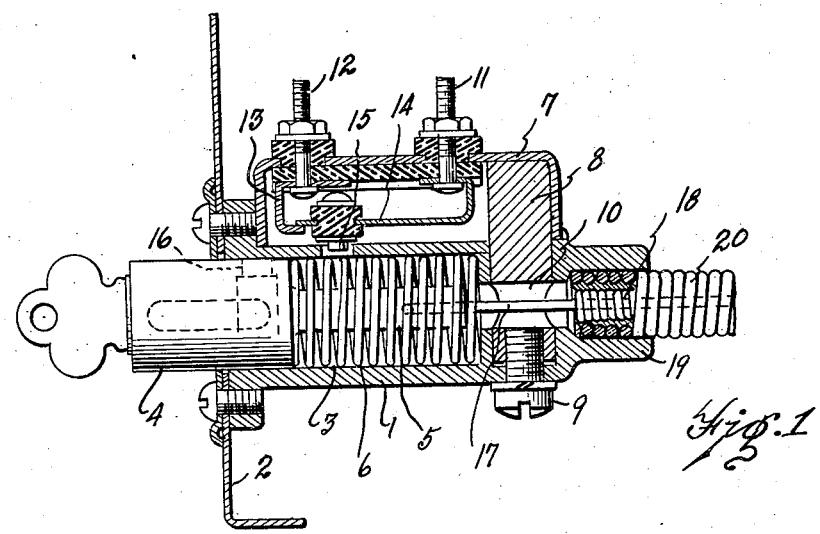
Fig. 1 is a section through an automobile lock embodying my invention in the unlocked position.

As shown in Fig. 1 the lock comprises a lock body or casing 1 which is fastened to the instrument board 2 and is provided with a recess 3 in which the cylindrical lock member 4 is positioned. This lock member 4 is provided with an extending end 5 about which a coiled spring 6 is positioned to move the lock 4 outwardly to the position shown in Fig. 1. A casing 7 is welded to a member 8 which fits in an aperture provided therefor in the lock body 1 and is held in place by the screw 9. This member 8 is provided with an aperture 10 through which the stem 5 extends when in the locked position thus preventing removal of the casing 7 from the lock body 1. Two contact members 11 and 12 are mounted in the casing 7 and insulated therefrom and a stationary contact 13 is secured to the member 12 while a flat spring contact 14 is secured to the member 11. The end of the spring 14 engages the contact 13 as shown in Fig. 1 when the lock is in the unlocked position and closes the ignition circuit. A member 15 is supported by and insulated from the contact spring 14 and when the lock is moved to the locked position shown in Fig. 2 and the key is turned a plunger 16 is moved upwardly to engagement with the member 15 thus raising the spring contact 14 away from the contact 13 and breaking the ignition circuit. In this position, shown in Fig. 2, the contact member 15 grounds one side of the ignition circuit through the lock and automobile frame.

Figure 2:
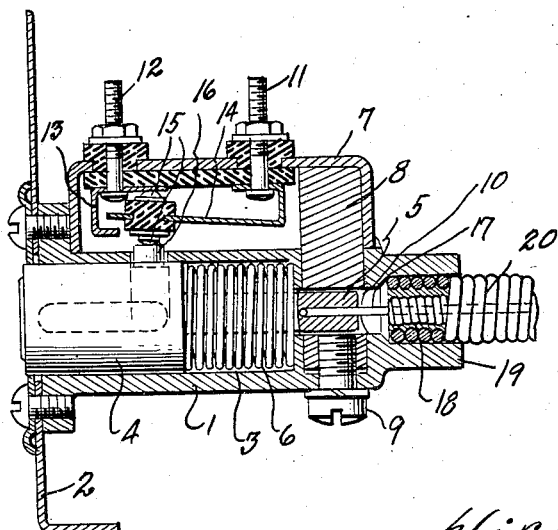
Fig. 2 is a similar section showing the device in the locked position.

A wire 17 is attached to the stem 5 as shown in Figs. 1 and 2 and extends through a wound wire armor conduit 18 which is brazed in position in a boss 19 on the lock body 1. The flexible armor conduit 18 is enclosed within an outside armor tube 20 which is also brazed in position within the boss 19. The wire 17 may be moved longitudinally through the conduit 18 by longitudinal movement of the lock member 4 to actuate the coincidental lock. As shown in Fig. 3 a plate 21 is secured to the transmission housing 22 shown in Fig. 4 by the bolts 23 and 24. A member 25 is secured to the plate 21 as shown in Figs. 3 and 4 and the end of the flexible outer tube 20 is brazed in this member 25 while the inner tube 18 extends freely therethrough. A square member 26 is secured to the end of the flexible tube 18 and the wire 17 extends therefrom and is attached to the lever 27 at the point 28. The lever 27 is pivotally mounted on the stud 29 extending from the plate 21. This lever 27 is provided with an arcuate end 30 as shown in Figs. 3 and 4 and when the lock member 4 is moved to the locked position the wire 17 is moved longitudinally thus moving the end 30 and lever 27 from the position shown in full lines in Fig. 3 to that shown in dotted lines in the said figure. This movement of the lever 27 moves the arcuate end 30 between the end of the clutch release yoke 31 and transmission housing 22. It will be noted that when the device is being locked it is necessary that the clutch pedal be pushed down with the foot so that the clutch is released when the end 30 is moved between the clutch and housing and this end 30 prevents the clutch release yoke 31 from moving to the left of Fig. 4 and causing the clutch to engage. By this arrangement the clutch is held in the disengaged position as long as the car is locked.

To operate the lock the operator pushes down on the clutch pedal to release the clutch and inserts the key in the lock member 4 as shown in Fig. 1 and forces the lock member inwardly to the position shown in Fig. 2 at which time the key may be turned to force the member 16 outwardly thus raising the member 14 to break the ignition circuit and grounding one side of the ignition circuit through the member 15. This inward movement of the lock member 4 moves the wire 17 longitudinally thus turning the lever 27 on its pivot so that the arcuate portion 30 is positioned between the clutch release yoke 31 and the transmission housing 22 thus holding the clutch out of engagement. At this time it is impossible to start the automobile as the ignition circuit is broken and grounded and the clutch cannot be engaged to drive the automobile. To unlock the device the key is inserted in the lock member 4 shown in Fig. 2 and is turned to retract the member 16 into the lock member at which time the spring 6 moves the lock member 4 outwardly to the position shown in Fig. 1 thus drawing the wire 17 longitudinally and raising the lever 27 on its pivot to move the arcuate end 30 out from between the clutch release yoke and transmission housing at which time the automobile may be driven in the usual manner. A square block 26 is brazed onto the end of the inner flexible conduit 18 as shown in Fig. 3. This block 26 is held from turning because the conduit 18 cannot turn. A member 32 is pivotally mounted at 35 on the bracket 25 and a spring 33 is provided tending to turn the member 32 on its pivot. The member 32 is provided with an arcuate face 34 eccentric to the pivot 35 and riding in engagement with the lever 27 when it is in the unlocked position. The member 32 is provided with an upturned lug 36 which engages one corner of the square block 26. This prevents the member 32 from turning on its pivot.

In order to steal the car it is necessary to get hold of the wire 17 in order to draw the lever 27 upwardly from the locked dotted position shown in Fig. 3. This may be attempted by prying the coils of the outer conduit 20 apart but this elongates the outer conduit and draws the inner conduit 18 upwardly and when the block 26 passes off from the lug 36 the member 32 is turned on its pivot by the spring 33 until the face 34 thereof engages the lever 27 which is in the dotted position and absolutely prevents upward movement of the lever 27 except by tearing down the transmission housing. Another attempt might be made by cutting through the conduits 18 and 20 and wire 17 with a pair of heavy bolt shears. If this is done the conduit 18 is free in the conduit 20 and as the lug 36 engages the corner of the block 26 it will turn the block 26 and member 18 around as the lug 36 passes thereby. This allows movement of the member 32 to the locked position at which time it engages the lever 27 in the dotted position and permanently locks the said lever. Actually the bolt shears would tend to spread the coils of the conduit 20 apart where the shears are applied which would draw the block 26 up above the lug 36 and allow the permanent locking member 32 to move to locked position. By this arrangement it can be seen that while the car is locked it is impossible to unlock it and if the locking device is tampered with the car will become permanently locked and can only be again put in condition for use by tearing down the transmission housing and repairing the mutilated parts.

From the foregoing description it becomes evident that the device is very simple and efficient in operation, provides a double lock for the car, will not easily get out of order, and provides a device which accomplishes the objects described.

Having thus fully described my invention, its utility and mode of operation, what I claim and desire to secure by Letters Patent of the United States is—

1. A locking mechanism adapted to be operated by a reciprocating wire enclosed in a flexible conduit comprising a transmission housing, a clutch yoke movable in relation to the transmission housing, a lever pivotally mounted on the transmission housing, the said wire being connected to the said lever, the arrangement being such that as the wire is moved in one direction the lever is turned on its pivot to position the end thereof between the end of the clutch release yoke and the transmission housing to prevent engagement of the clutch.

2. A locking mechanism adapted to be operated by a reciprocating wire enclosed in a flexible conduit comprising a lever connected to the said wire, a transmission housing to which the lever is pivotally mounted at one end, a clutch release yoke, the end of the lever being movable by the wire to position between the clutch release yoke and the transmission housing, and a spring actuated means adapted to engage the said lever and hold it in position between the end of the clutch release yoke and the transmission housing upon cutting or elongation of the flexible conduit.

3. A locking mechanism adapted to be operated by a reciprocating wire enclosed in a flexible conduit, comprising a lever connected to the said reciprocating wire, a transmission housing to which the lever is pivotally mounted at one end, a clutch release yoke, the end of the lever being movable by the said wire to position between the end of the clutch release yoke and the transmission housing, and spring actuated means adapted to be automatically released upon cutting or elongation of the flexible conduit, the said means when released preventing removal of the end of the said lever from between the end of the clutch release yoke and the said housing.

4. A locking mechanism adapted to be operated by a reciprocating wire enclosed in a flexible conduit, comprising a transmission housing, a clutch release yoke, a lever pivotally mounted at one end on the transmission housing and having an end adapted to be positioned between the clutch release yoke and the transmission housing when the clutch is disengaged, the said wire being connected to the lever intermediate its ends and the arrangement being such that upon movement of the said wire in one direction the end of the lever is positioned between the end of the clutch release yoke and the adjacent transmission housing wall.

5. A locking mechanism adapted to be operated by a reciprocating wire enclosed in a flexible conduit, comprising a lever connected to the said wire, a transmission housing to which the lever is pivotally connected at one end, a clutch release yoke, the end of the lever being movable between the clutch release yoke and the transmission housing by movement of the said wire in one direction while the clutch is disengaged.

6. A locking mechanism adapted to be operated by a reciprocating wire enclosed in a flexible conduit, comprising a clutch actuating member, a transmission housing relative to which the clutch actuating member is movable, and a lever adapted to be moved between the clutch actuating member and the housing to prevent engagement of the clutch.

In testimony whereof I sign this specification.

ELIZABETH M. BALLAMOS.